July 21, 1925.  1,546,719
E. E. DAVIS
TUBE AND ROD TRAP
Filed Dec. 13, 1924   2 Sheets-Sheet 1
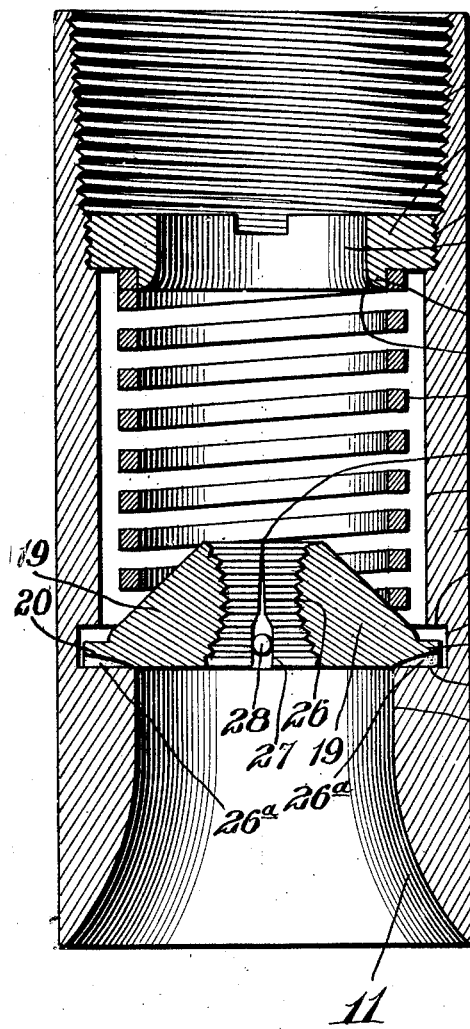
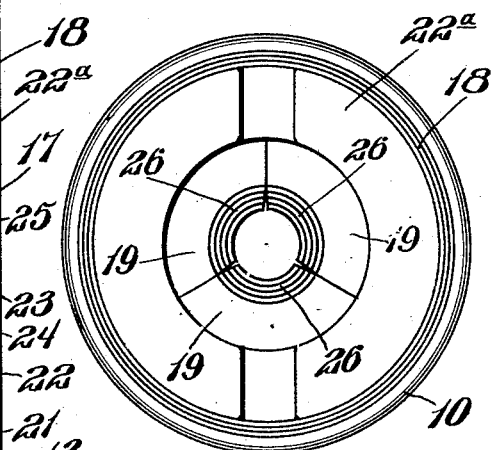
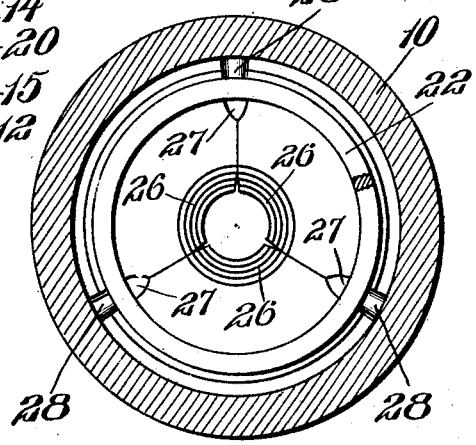
INVENTOR
Elmer E. Davis
Watson E. Coleman
ATTORNEY July 21, 1925.

E. E. DAVIS 1,546,719

TUBE AND ROD TRAP

Filed Dec. 13, 1924

INVENTOR
Elmer E. Davis
Watson E. Coleman
ATTORNEY

Patented July 21, 1925.

1,546,719

UNITED STATES PATENT OFFICE.

ELMER E. DAVIS, OF CISCO, TEXAS.

TUBE AND ROD TRAP.

Application filed December 13, 1924. Serial No. 755,744.

*To all whom it may concern:*

Be it known that I, ELMER E. DAVIS, a citizen of the United States, residing at Cisco, in the county of Eastland and State of Texas, have invented certain new and useful Improvements in Tube and Rod Traps, of which the following is a specification, reference being had to the accompanying drawings.

This invention relates to a combination tube and rod trap for use in fishing for broken rods, tubes or the like in deep wells.

An important object of the invention is to provide a device of this character having a single set of slips capable of a wide range of usage without in any way changing the position or arrangement of the slips in the tool to permit such use.

A further object of the invention is to provide an improved slip construction by means of which the operation above described is rendered possible.

Other objects and advantages lie in the details of construction shown in the drawings wherein for the purpose of illustration is shown a preferred embodiment of my invention and wherein:—

Figure 1 is a vertical sectional view through a combined tube and rod trap constructed in accordance with my invention;

Figure 2 is a plan view thereof;

Figure 3 is a horizontal sectional view therethrough taken immediately above the gripping member;

Figure 4:
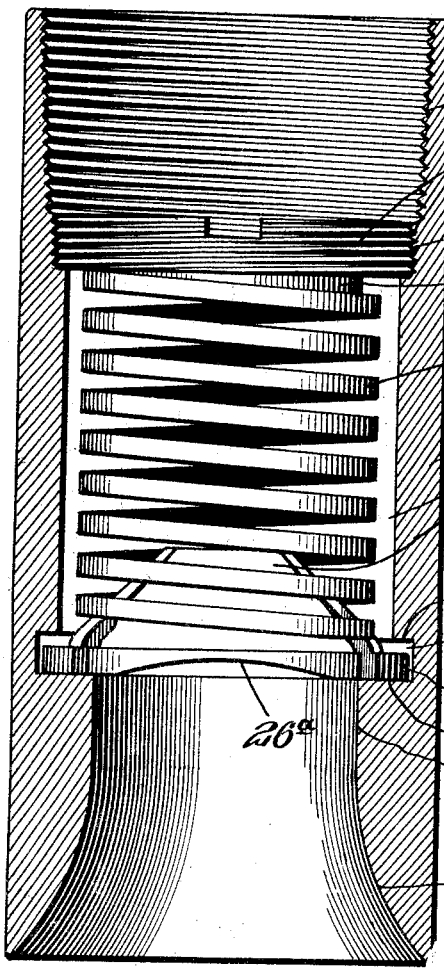
Figure 4 is a vertical sectional view through the shell the gripping member spring and ring nut being shown in elevation.
Figure 5:
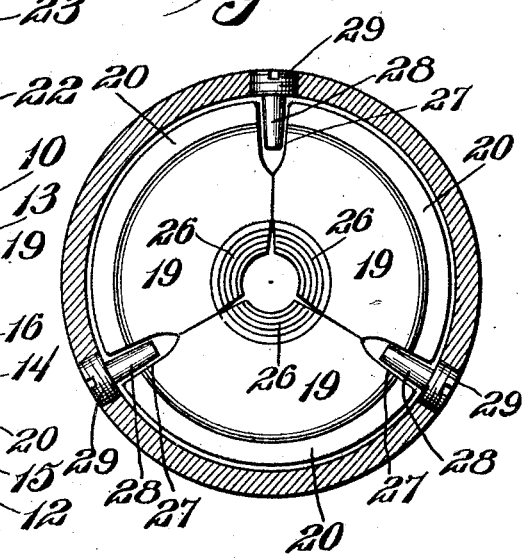
Figure 5 is a section taken through the trap at the top of the gripping member.

Referring now more particularly to the drawings, the trap includes a bowl or body 10 having a bore opening through its lower end and increasing in diameter toward such lower end so as to provide a funnel shaped mouth 11 leading into the bore which is designated at 12. Immediately above the lower end of the body, the bore is increased in size, as indicated at 13 and the wall of the body at the point of connection of the bores 12 and 13 is provided with a channel 14 increasing the diameter of the bore 13 and increasing the size of the upwardly facing shoulder 15 formed at the juncture of the bores. This channel 14 additionally provides a downwardly facing shoulder 16 in opposition to the shoulder 15. The purpose of these shoulders will hereinafter appear. Adjacent its upper end the bore 13 is enlarged and screw-threaded, as at 17, and above the screw-thread 17 is threaded, as at 18, to receive the joint of a fishing pipe or the bit of a tool as may be desired.

A plurality of slips 19 are provided which combine to produce a frusto-conical pipe or rod grip. In the present instance, three of these slips are shown, each slip having a flange 20 seating upon the shoulder 15 and extending beneath the shoulder 16 so that if the slips are moved upwardly they engage against the shoulder 16 and they normally rest at their outer edges upon the shoulder 15. The upper ends of these slips in the normal position of the slips engage against one another, as at 21, to limit the tilting movement of the slips. The slips are held in this normal position by means of a spring 22, the lower end of which surrounds and abuts the slips, engaging the conical surface of the gripping member and the upper end of which engages the under surface of a ring nut 22ª engaged with the thread 17 and having a rib 23 engaging the spring interiorly to prevent displacement thereof. This rib has its inner face 24 inclining upwardly and inwardly so that when engaged by a pipe or rod, it will direct the same through the bore 25 of the ring nut.

The slips 19 combine to provide a frusto-conical bore for the gripping member, the inner face of each of the slips being provided with transversely extending teeth 26. When the slips are in normal position, a small opening is provided, this opening being preferably of slightly smaller size than the size of the pump rods ordinarily employed in a well. It will be obvious that where these pump rods or any article larger than the pump rod and small enough to enter the bore 12 is engaged by the bowl, it will be directed upwardly through the gripping member and during its passage through the gripping member will cause its slips 19 to rock upon the flanges thereof until the opening provided is of sufficient size to permit its passage. With the rod extended through the gripping member elevation of the bowl will cause the teeth 26 of the slips to bite into the rod and the slips 19 will tend to return to their normal position so that this biting action is increased in proportion to the amount of pressure which can be overcome to lift the rod. In their tendency to return to their normal position, the slips will be assisted by the spring 22. In order to facilitate the rocking movement of the slips upon the shoulder 15, the bottom faces of the slip are arcuately curved, as at 26. Adjacent faces of the slips 19 at the base thereof are provided with notches 27 combining to form a slot receiving the end of a pin 28, the head 29 of which is threaded through the wall of the body at the channel 14. These pins will prevent rotation of the slips upon the shoulder 15 and will accordingly prevent rotation of the gripping member with relation to the bowl.

It will be obvious that the structure hereinbefore set forth is capable of a certain range of change and modification without materially departing from the spirit of my invention and I accordingly do not limit myself to such specific structure except as hereinafter claimed.

I claim:—

1. In a tube and rod trap, a bowl having a bore the lower end of which is formed to provide a flaring mouth, the wall of the bore above said mouth having an upwardly directed shoulder, a gripping member comprising a plurality of slips having their lower outer faces loosely seated upon said shoulder and their inner faces inclining upwardly and inwardly and provided with transversely extending teeth, the upper ends of said slips engaging one another for mutual support and a spring urging said slips downwardly.

2. In a tube and rod trap, a bowl having a bore the lower end of which is formed to provide a flaring mouth, the wall of the bore above said mouth having an upwardly directed shoulder, a gripping member comprising a plurality of slips having their lower outer faces loosely seated upon said shoulder and their inner faces inclining upwardly and inwardly and provided with transversely extending teeth, the upper ends of said slips engaging one another for mutual support, a spring urging said slips downwardly engaging the slip at its lower end and a ring nut threaded into the upper end of the bore of the bowl and against which the upper end of the spring engages.

3. In a tube and rod trap, a bowl having a bore the lower end of which is formed to provide a flaring mouth, the wall of the bore above said mouth having an upwardly directed shoulder, a gripping member comprising a plurality of slips having their lower outer faces loosely seated upon said shoulder and their inner faces inclining upwardly and inwardly and provided with transversely extending teeth, the upper ends of said slips engaging one another for mutual support, a spring urging said slips downwardly and means for preventing circumferential rotation of said slips.

4. In a tube and rod trap, a bowl having a bore the lower end of which is formed to provide a flaring mouth, the wall of the bore above said mouth having an upwardly directed shoulder, a gripping member comprising a plurality of slips having their lower outer faces loosely seated upon said shoulder and their inner faces inclining upwardly and inwardly and provided with transversely extending teeth, the upper ends of said slips engaging one another for mutual support and a spring urging said slips downwardly, said slips being provided at their lower ends in adjacent faces thereof with notches combining to provide a slot and pins directed through the wall of the bowl and engaging in said slots.

5. In a tube and rod trap, a bowl having a bore the lower end of which is formed to provide a flaring mouth, the wall of the bore above said mouth having an upwardly directed shoulder, a gripping member comprising a plurality of slips having their lower outer faces loosely seated upon said shoulder and their inner faces inclining upwardly and inwardly and provided with transversely extending teeth, the upper ends of said slips engaging one another for mutual support and a spring urging said slips downwardly, the lower outer faces of said slips being curved to facilitate rocking movement of the slips upon the shoulder.

6. In a tube and rod trap, a bowl having a bore the lower end of which is formed to provide a flaring mouth, the wall of the bore above said mouth having an upwardly directed shoulder, a gripping member comprising a plurality of slips having their lower outer faces loosely seated upon said shoulder and their inner faces inclining upwardly and inwardly and provided with transversely extending teeth, the upper ends of said slips engaging one another for mutual support and a spring urging said slips downwardly, the bowl having means limiting upward movement of the slips therein.

7. In a tube and rod trap, a bowl having a bore the lower end of which is formed to provide a flaring mouth, the wall of the bore above said mouth having an upwardly directed shoulder, a gripping member comprising a plurality of slips having their lower outer faces loosely seated upon said shoulder and their inner faces inclining upwardly and inwardly and provided with transversely extending teeth, the upper ends of said slips engaging one another for mutual support and a spring urging said lips downwardly, the bowl having means limiting upward movement of the slips therein, comprising a downwardly facing shoulder beneath which the lower outer faces of the slips extend.

In testimony whereof I hereunto affix my signature.

ELMER E. DAVIS.